(12) United States Patent
Hurley et al.

(10) Patent No.: US 11,379,906 B2
(45) Date of Patent: Jul. 5, 2022

(54) DOCUMENT EXCHANGE CONVERSATION GENERATOR

(71) Applicant: Epicor Software Corporation, Dublin, CA (US)

(72) Inventors: Michael Hurley, Shaker Heights, OH (US); Christopher Manchen, Chagrin Falls, OH (US); Michael Snyder, Jr., Aurora, OH (US); Ryan Williams, Cuyahoga Falls, OH (US); Nathaniel Schaffer, University Heights, OH (US); Andrew Murgola, Twinsburg, OH (US); Mark Rousseau, Wooster, OH (US)

(73) Assignee: Epicor Software Corporation, Dublin, CA (US)

( * ) Notice: Subject to any disclaimer, the term of this patent is extended or adjusted under 35 U.S.C. 154(b) by 56 days.

(21) Appl. No.: 16/881,994

(22) Filed: May 22, 2020

(65) Prior Publication Data

US 2020/0394702 A1 Dec. 17, 2020

Related U.S. Application Data

(63) Continuation of application No. 15/386,332, filed on Dec. 21, 2016, now Pat. No. 10,664,898.

(Continued)

(51) Int. Cl.
*G06Q 30/00* (2012.01)
*G06Q 30/06* (2012.01)
(Continued)

(52) U.S. Cl.
CPC ......... *G06Q 30/0635* (2013.01); *G08B 21/18* (2013.01); *H04L 51/046* (2013.01); *H04L 51/16* (2013.01)

(58) Field of Classification Search
None
See application file for complete search history.

(56) References Cited

U.S. PATENT DOCUMENTS 5,557,780 A 9/1996 Edwards
5,758,126 A 5/1998 Daniels
(Continued)

FOREIGN PATENT DOCUMENTS

AU 2012100638 6/2012

OTHER PUBLICATIONS

Lang, Laura "EDI systems work well, but not with each other. Everyone agrees on the benefits of EDI, but not ona standard so the systems can communicate with each other" Air Cargo World 81.n12: p24(6). UBM Aviation Worldwide LLC. (Dec. 1991) (Year: 1991).*

(Continued)

*Primary Examiner* — Naeem U Haq
(74) *Attorney, Agent, or Firm* — Calfee, Halter & Griswold LLP

(57) ABSTRACT

Exemplary systems and methods associated with generating conversations of electronic data exchanges. In particular, in one embodiment, a conversation generator determines whether records are related based on EDI data associated with a transaction, integrates the records based on associations within the EDI data, and generates a conversation that depicts the integrated EDI data associated with the transaction in a conversational format for viewing by a user. In other embodiments, an alert engine determines that there are errors in the conversation, such as missing or inconsistent data, and alerts a user accordingly.

21 Claims, 18 Drawing Sheets

Related U.S. Application Data

(60) Provisional application No. 62/270,799, filed on Dec. 22, 2015.

(51) Int. Cl.
*H04L 51/046* (2022.01)
*G08B 21/18* (2006.01)
*H04L 51/00* (2022.01)

(56) References Cited

U.S. PATENT DOCUMENTS

| | | | | |
|---|---|---|---|---|
| 5,878,419 | A | * | 3/1999 | Carter .................. G06F 16/258 707/703 |
| 6,321,228 | B1 | | 11/2001 | Crandall |
| 6,490,718 | B1 | | 12/2002 | Watters |
| 8,108,767 | B2 | * | 1/2012 | Gaurav ................. G06F 3/0482 715/255 |
| 10,664,898 | B2 | | 5/2020 | Hurley et al. |
| 2002/0049790 | A1 | | 4/2002 | Ricker |
| 2003/0158805 | A1 | | 8/2003 | Mozhdehi |
| 2004/0039576 | A1 | * | 2/2004 | He ..................... G06Q 10/0637 705/28 |
| 2005/0273467 | A1 | * | 12/2005 | Gardner ................. G06F 16/20 |
| 2007/0203928 | A1 | * | 8/2007 | Machiraju ............. G06Q 30/06 |
| 2010/0083084 | A1 | | 4/2010 | Cicman |
| 2011/0158485 | A1 | * | 6/2011 | Hsieh ..................... G06F 21/64 382/119 |

OTHER PUBLICATIONS

Collin D. Ramdeen, Jocelina Santos & Hyun Kyung Chatfield (2009) "EDI and the Internet in the E-Business Era", International Journal of Hospitality Tourism Administration, 10:3, 270-282, DOI: 10.1080/15256480903088683 (Year: 2009).*

* cited by examiner

FIG. 1

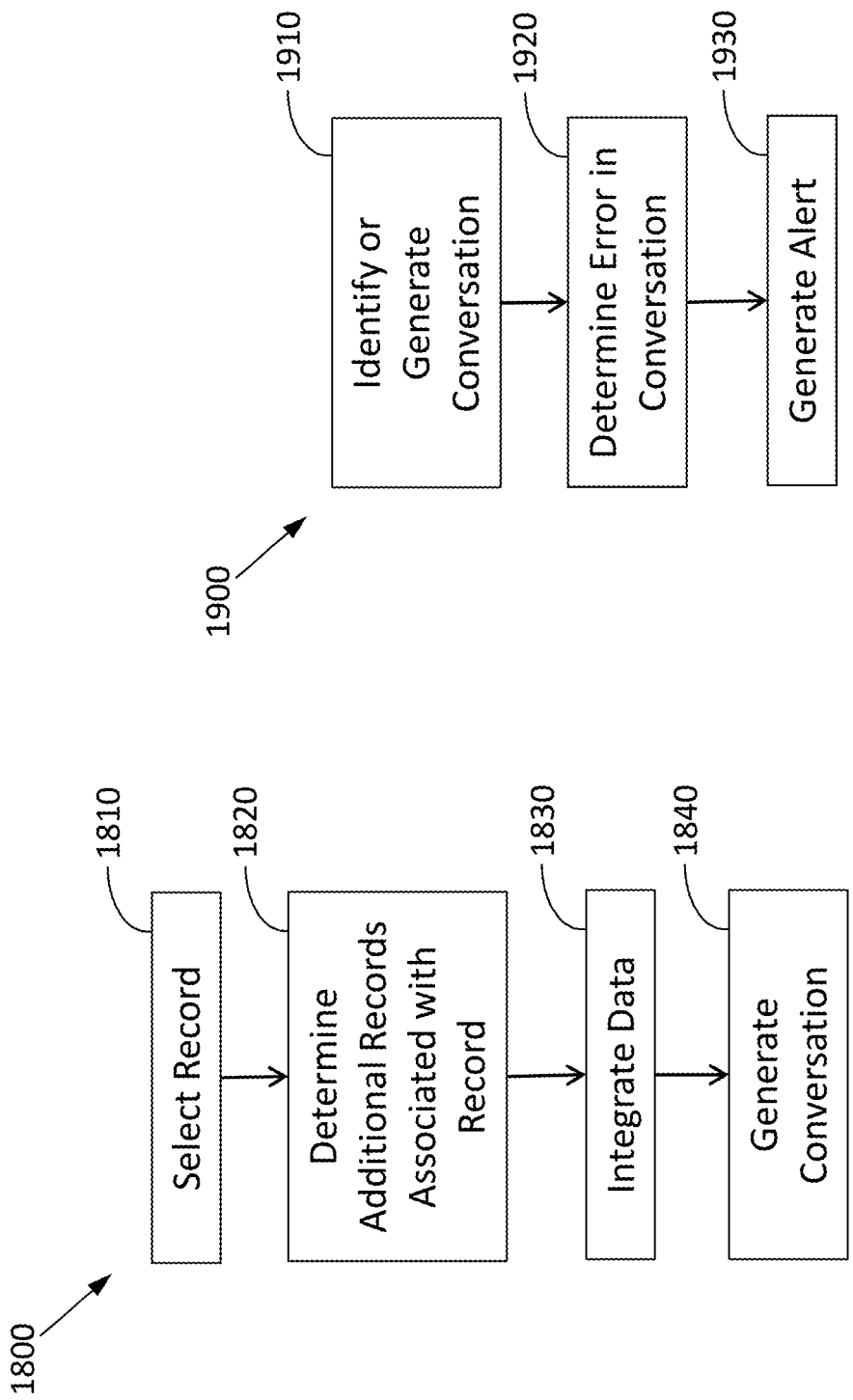

DOCUMENT EXCHANGE CONVERSATION GENERATOR

CROSS-REFERENCE TO RELATED APPLICATIONS

This application is a continuation application of U.S. patent application Ser. No. 15/386,332, filed Dec. 21, 2016, which claims the benefit of U.S. Provisional Patent Application Ser. No. 62/270,799, filed Dec. 22, 2015, which are fully incorporated herein by reference.

BACKGROUND

The present disclosure generally relates to the field of electronic business to business (B2B) document exchange systems. For example, two parties may have a relationship that includes electronic records of, for example, a transaction, such as the exchange of goods and/or services. In such transactions, various records or documents may be exchanged electronically. To facilitate communication between parties, standardized forms of communication may be used. For example, electronic data interchange (EDI) is an electronic communication method that provides standards for exchanges of data via electronic means. The parties may have different systems for processing the records or messages associated with the transaction, each with its own interface and operations. The raw data is often difficult to understand. Even formatted text files that include EDI data may require expertise on the part of a user in order to determine the information in a data file.

The present invention relates to systems and methods of identifying or determining related B2B records, determining, integrating, and/or aggregating data to generate conversations based on the data in the records, and rendering or depicting the conversations to one or more users.

Applicants have also appreciated that there is a need for a system to utilize the B2B document information to trigger alerts when information is not accurate and/or to determine that one or more records are not present in the normal flow of the B2B exchange.

SUMMARY

According to one aspect of the present invention, a system for generating conversational depictions of electronic data exchanges includes a first user device to select a first record comprising EDI data, a conversation generator configured to determine additional records associated with the first record based on the EDI data, integrate the EDI data of the first record and the additional records based on associations within the EDI data, and generate a conversation that depicts the integrated EDI data in a conversational format, and a user interface to display the conversation.

The descriptions of the invention do not limit the words used in the claims in any way or the scope of the claims or invention. The words used in the claims have all of their full ordinary meanings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention.

FIG. 1 illustrates an exemplary EDI source file.

FIG. 18 shows a flow diagram of an exemplary method of generating a conversation.

FIG. 19 shows a flow diagram of an exemplary method of generating an alert.

DESCRIPTION

Figure 2:
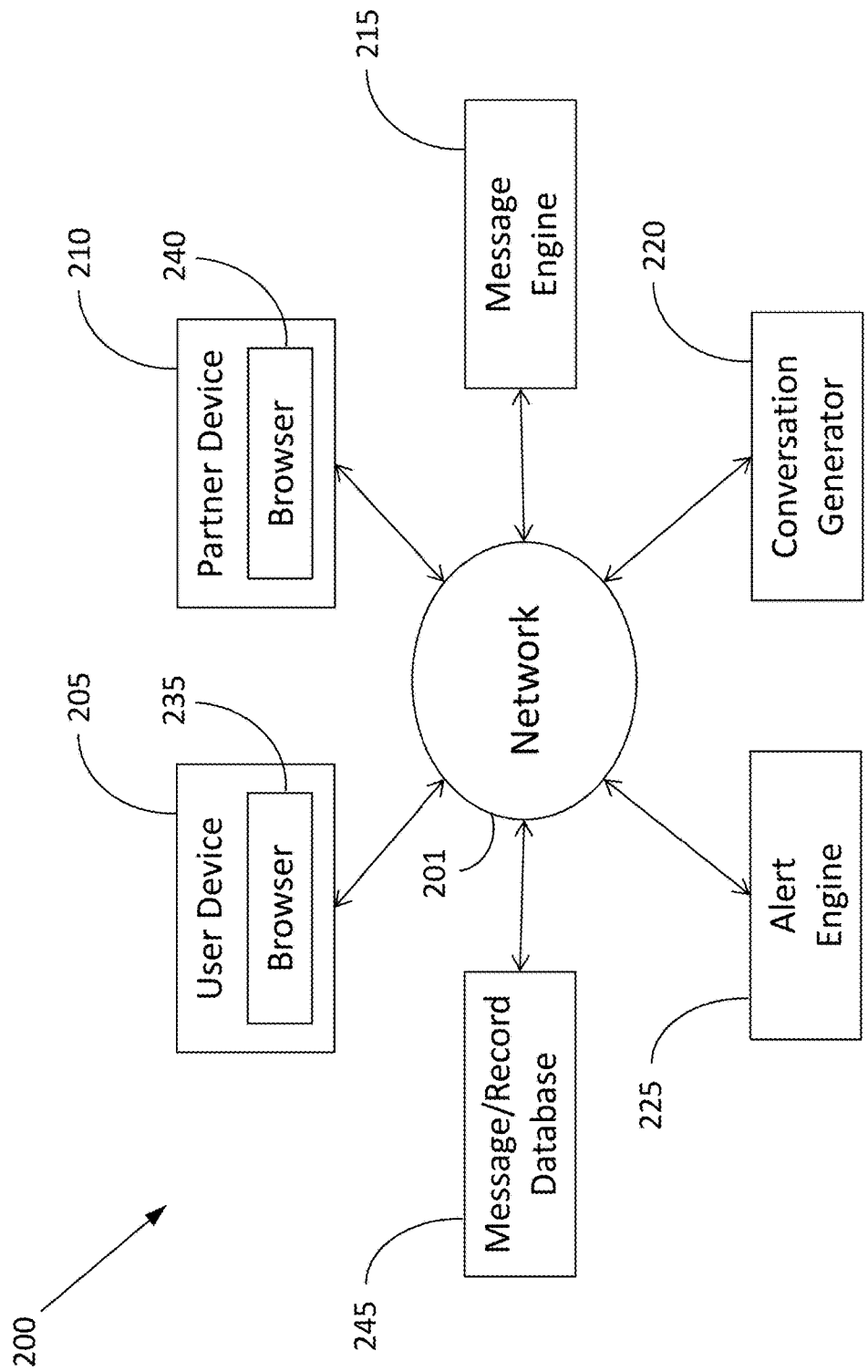
FIG. 2 illustrates a block diagram of an exemplary system for generating conversations.

This Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

The following includes definitions of exemplary terms used throughout the disclosure. Both singular and plural forms of all terms fall within each meaning.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discreet logic such as an application specific integrated circuit (ASIC), or other programmed logic device. Logic may also be fully embodied as software. As used herein, "logic" is considered synonymous with "circuit."

"Operative communication" or "circuit communication," as used herein includes, but is not limited to, a communicative relationship between devices, logic, or circuits. Two devices are in operative communication if an action from one causes an effect in the other, regardless of whether the action is modified by some other device. For example, two devices separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) 802.11 communications links, xi) satellite communication links, xii) near-field communication, and xili) other wired and/or wireless communication links. As an example, two devices not directly connected to each other, but both capable of interfacing with a third device, e.g., a central processing unit (CPU), are in operative communication.

"Processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system, or other types of executable instructions. It will be appreciated by one of ordinary skill in the art that the form of software is dependent on, for example, requirements of a desired application, the environment it runs on, or the desires of a designer/programmer or the like.

While the above exemplary definitions have been provided, it is Applicant's intention that the broadest reasonable interpretation consistent with this specification be used for these and other terms.

Based on the electronic exchange of information, EDI includes rules, guidelines, and standard formats on the exchange of information between partners. This allows for data exchange between partners—a "pipe" to facilitate the exchange of information between partners. What's missing is the ability to break into the "pipe" and analyze the more relevant data to improve the visibility of the information flowing through the EDI pipe. High level analytics can provide significant improvements in the way business can be performed and/or managed.

For example, as described in detail below, improvements to this technology include generating conversations that depict electronic message exchanges and generating alerts for exceptions or errors. In particular, for example, an alert can relate to a price point on an invoice that does not match the price mentioned in a purchase order. The alert avoids scenarios where the invoice might get rejected by the customer for reasons like unmatched pricing. Use of the system described herein can eliminate the process of reissuing an invoice that can lead to duplication. In addition, the conversation and alert generation system can operate with an existing EDI management system.

Further, the system can not only identify mismatches between the invoice and the purchase order, but also intercept the flow of automated transactions between two partners based on a criterion established by a client. This can act as a checkpoint to identify only those transactions and information that are inconsistent with the guidelines of a user, preventing inefficient and error prone operations, thereby reducing costs.

In another example, the system described herein can notify a shipping team if their customers require them to send out an Automated Shipping Notice (ASN) and alert them if the ASN is at risk of being late. The series of checks can enable customers to have a better view of internal operations—whether an ASN is sent, are they effectively meeting all ASN requirements across their customers, and whether the prices are matching. The system increases awareness of operating inefficiencies amongst finance, customer support, and fulfillment teams and acts as a performance scorecard to monitor the progress and take corrective action on those parts of the exchange that need remedial action.

In some instances, partners, for example, a vendor and a purchaser, may have a contractual relationship and/or engage in various communications and/or transactions, for example, the exchange of goods and/or services. In such communications and/or transactions, various records, including, for example, electronic documents and/or data, such as, purchase orders, purchase order acknowledgements, shipping notices, invoices, etc., exist electronically and are often exchanged between the parties before, during, and/or after the transactions to ensure that the transaction was performed to the satisfaction of both parties. Oftentimes, the user, which, for example, may be a business that resells goods, such as a market or other retail store, may be in constant communication with partners, such as vendors, thus resulting in numerous goods requests, invoices, shipping notices, bills of sale, and billing forms that are being exchanged between the user and multiple partners (vendors). Likewise, the user, which may also be a vendor, may have hundreds, if not thousands, of customers involving even more transactions.

To facilitate communication between parties or businesses, which may also be users, and their respective partners, such as purchasers, customers, and/or vendors, standardized forms of recording and communication data may be used. For example, electronic data interchange (EDI) is an electronic communication method that provides standards for exchanges of data via electronic means. Even though parties may agree to exchange information utilizing EDI, a vendor and a user may have different systems for processing electronic records, such as messages, each with its own interface and operations, yet the systems may still be capable of exchanging meaningful data as long as the exchanged data is in an acceptable EDI format. However, the raw data is often difficult to understand. Even formatted text files that include EDI data may require expertise on the part of a user in order to determine the information in a data file.

Instances of errors can always occur within a collection of related EDI records, including, for example, records associated with a transaction. For example, when an issue arises with a purchaser or vendor, such as a missing shipment, a late shipment, or an unpaid bill, a user may be required to investigate past records of messages to determine where an issue or error occurred and what caused the issue. Additionally, because the data is often difficult to process, errors may not be apparent until much later, such as when a shipment has been identified as missing or a bill that includes a late fee is issued. Furthermore, because EDI messages are often related to other EDI messages, it may be difficult to identify a full conversation of messages; that is, the entire set of message records related to one transaction, in a timely manner. A conversation herein includes the ordinary customary meaning of a conversation. For example, applied in the electronic message exchange context, a conversation can include the depiction of EDI data or records involved in an exchange between two parties or users in a conversational format that replicates the back-and-forth communications between the two parties or users.

Figure 1:
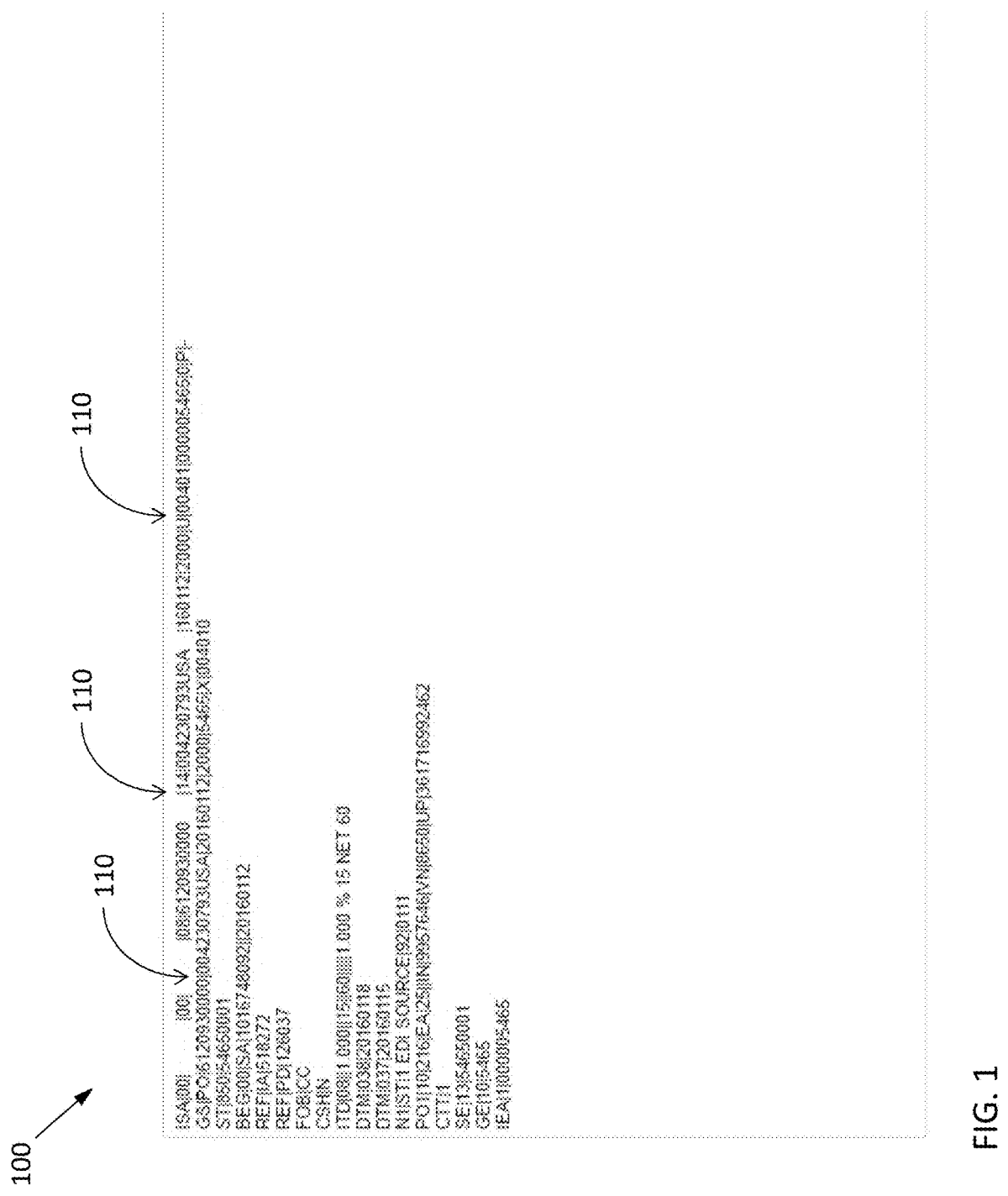

With reference now to FIG. 1, an example of an EDI source file or record 100 is shown. Although the file includes all meaningful data for a purchase order, the data is separated by field separator characters 110 (i.e., "|") and fields are not marked. Therefore, for a user to review the native EDI data, knowledge of what each value represents is required. Additionally, the data may be easily misread because the data is compact and formatted for computer-readable technology, not optimized for user reading.

Referring to FIG. 2, a block diagram of an exemplary environment or system 200 for generating conversations and/or alerts is shown. Among other things, for example, the system 200 can analyze records to determine if records are associated with a selected record based on the EDI data in the records, integrate the EDI data of the records based on associations within the EDI data, and generate a conversation that depicts the integrated EDI data in a conversational format. System 200 is an improvement over existing technology that cannot integrate EDI data from various records into a conversation, allowing access to EDI data stored in multiple records or messages at the same time in an integrated and relational format that users can review. System 200 includes a communication network 201, a user device 205, a partner device 210, a message engine 215, a conversation generator 220, and an alert engine or generator 225. Additionally, the diagram includes a record/message database 245 that may be associated one or more of the other components, including, for example, the user device 205, the partner device 210, and web browsers 235 and 240 executing on the user device 205 and the partner device 210 respectively. It should be appreciated that more than one of each of the components shown may be associated with the system 200, including, for example, multiple user devices 205, multiple partner devices 210, etc. The communication network 201 facilitates communication between the various components in the system 200. In some embodiments, the communication network 201 may include various types of networks, including, for example, the Internet, one or more intranets, LANs, WANs, one or more bus subsystems, etc. The communication network 201 may optionally utilize one or more standard communications technologies, protocols, and/or inter-process communication techniques. The various components of the system may be in operative communication with each other (e.g., sending and receiving signals) directly or via the communication network 201.

The user device 205 and partner device 210 may be any type of communication device able to interact with the system 200, for example, a desktop computer, a laptop computer, a cellular phone, a smartphone, a personal digital assistant (PDA), a tablet, a navigation system, a wearable computing device (e.g., a digital watch, earpiece, glasses), and/or other computing device. The computing devices 205 and 210 may include memory for storage of data and software applications, a processor for accessing data and executing applications, and components that facilitate communication over communication network 201. In one embodiment, for example, user device 205 can include browser 235 that may be utilized by a user to, for example, communicate with one or more components, such as an invoice database 245 and/or invoice engine 215, where an invoice is an exemplary message. Similarly, partner device 210 can include a browser 240 that may be utilized by a partner (e.g., vendor) user to, for example, provide invoicing information to one or more components, and/or to communicate with one or more programs executing on the user device 205 or other components of the system 200. The browsers 235, 240 may display various screens of an application's user interface, as discussed herein. The application can include software or logic to execute the features of the system described herein, including, for example, the message engine 215, the conversation generator 220, and/or the alert engine 225.

In one embodiment, a typical series of communications or messages between a user and a partner, for example, a vendor, may include a user initially sending a message via user device 205. The information, for example, for an order, may be provided by a user utilizing a web browser, such as browser 235. One or more components, either executing locally on user device 205 or remotely on one or more alternate computers may receive the information, format the information into an EDI format, and send the EDI message to the vendor. The vendor may receive the EDI message via vendor device 210, and one or more components executing on vendor device 210 may analyze the EDI message to determine the goods and/or services that have been requested by the user. For example, a component executing on vendor device 210 and/or one or more other computing devices controlled by the vendor may receive a purchase order and begin a process for fulfilling the purchase order.

As the vendor fulfills the purchase order, vendor device 210 may send one or more communications or messages to the user via communication network 201, indicating statuses of events and/or other information. For example, vendor device 210 may send a message to the user indicating that the purchase order has been received, a message indicating an expected shipping date for an order, an invoice indicating an amount that is due for a shipped order, etc. Additionally or alternatively, the vendor may send messages indicating that an order cannot be filled, that a shipment is late, and/or other issues that may occur during the fulfillment of an order. Likewise, a user may send messages to a vendor that indicate that a shipment has been received, that a payment has been made, and/or acknowledgement of receipt of one or more other messages. Additionally or alternatively, the user may send messages indicating that a shipment has not been received, that a shipment was incorrect, that an invoice was incorrect, and/or other issues with the performance of the vendor.

Message engine 215 identifies messages that are sent by the user and/or messages that are received by the user from the vendor. In some embodiments, message engine 215 may include a component that is executing locally on user device 205. For example, messages may be sent and received via a component executing on user device 205, and a local component of message engine 215 may identify the messages and send information to message engine 215 indicating the arrival or departure of a message. Also, for example, messages may be sent to message engine 215, which may then facilitate sending the messages between the user device 205 and the vendor device 210. Message engine 215 may store incoming and departing messages in message database 245. The messages may be records that include EDI-standard data, as illustrated in FIG. 1.

In some embodiments, message engine 215 saves incoming messages in message database 245. For example, message engine 215 (and/or other components of the system 200) may be a component of an existing EDI management system, an add-on to an existing EDI management system, and/or an additional component executing on a system that receives messages from one or more other entities (e.g., message engine 215 is a component executing on a purchaser system and that receives messages from one or more vendors). Message engine 215 may store incoming messages, records of the messages, metadata associated with incoming messages, and/or other additional information related to incoming messages. Additionally, message engine 215 may identify outgoing messages from an EDI system and store the outgoing messages, records of the messages, metadata associated with the outgoing messages, and/or additional information, such as alerts that are associated with outgoing messages and/or conversations that include the outgoing messages.

A user may have interest in viewing a set of messages between the user and a particular partner, such as a vendor or purchaser. For example, in one embodiment, a user may have interest in viewing an original purchase order and further viewing an acknowledgment from the vendor. Using the system 200, the user may access one or more interfaces to view message records in a conversation format. A request to generate and view a conversation may be submitted by the user via user device 205. The conversation generator 220 can determine the records relevant to the associated communication or transaction based on the EDI data, integrate the EDI source data based on associations within the EDI data, generate a conversation that depicts the integrated EDI data in a conversation format, and render the content of the conversation to the user, as described in more detail below. For example, the user may submit a purchase order number of "123456," and conversation generator 220 can generate the conversation that includes purchasing order "123456."

Figure 3:
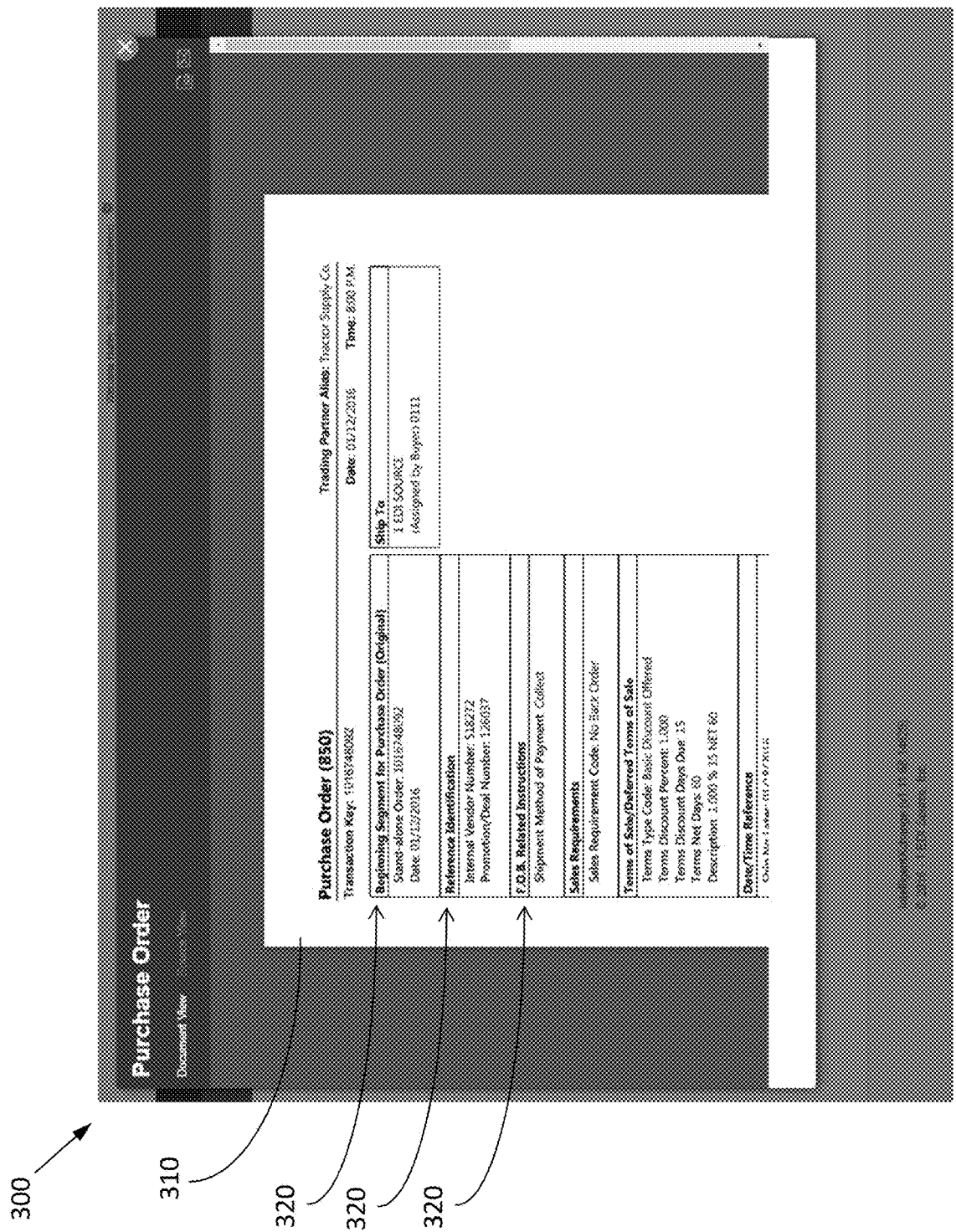
FIG. 3 shows an exemplary screen shot of a user interface for viewing a document.

Referring to FIG. 3, an exemplary screen shot of a user interface 300 for viewing a document 310 is shown. The document 310 may be based on an EDI source file, similar to file or record 100 shown in FIG. 1. The document 310 is generated from the EDI data in the associated record or message, but in a format that is readable to a non-trained user. For example, instead of utilizing stop characters 110 to delimit fields, formatted labels 320 are provided as information to allow a user to efficiently determine information of interest in the document or message. Using this document view, users are able to review an EDI based document in a formatted view that renders the data in a way that people are able to understand.

Figure 4:
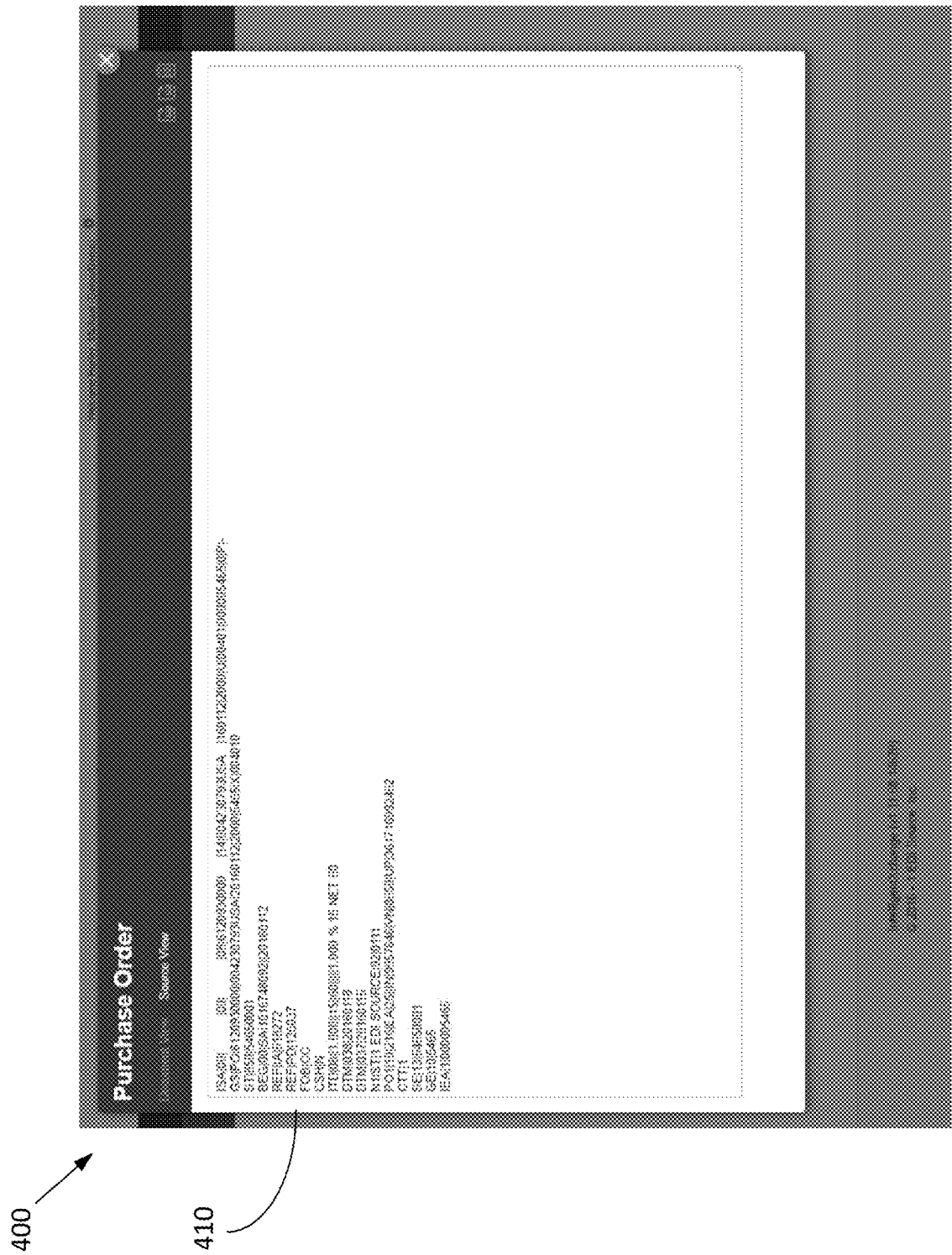
FIG. 4 shows an exemplary screen shot of a user interface for viewing a source EDI file.

Referring to FIG. 4, an exemplary screen shot of a user interface 400 for viewing the source EDI file 410 (same data as in source file 100) in a source view is shown. Using this view, users are able to review the native EDI data if necessary.

In various embodiments, conversation generator 220 may further parse the record of a retrieved or selected message to determine whether other records or messages are related to the record. For example, in one embodiment, conversation generator 220 may determine that a message includes purchase order information for purchase order "123456." Further, conversation generator 220 may parse the message and identify additional information in the message. For example, conversation generator 220 may determine a vendor name, product name, volume of a purchase, and/or other information by parsing the EDI-standard data or information in the record or message.

In some embodiments, conversation generator 220 may associate a message or record with one or more additional messages or records based on data in the records. For example, conversation generator 220 may determine that a message is an acknowledgement by a vendor of receipt of a purchase order. In some embodiments, conversation generator 220 may parse the information in the acknowledgement, identify a purchase order, and associate the purchase order with the acknowledgement. In some embodiments, conversation generator 220 may determine related messages as being associated to one another within a conversation as messages are received. Conversation generator 220 can integrate the EDI source data in these related messages based on these associations and generate a conversation that depicts the integrated EDI source data in a conversational format. Generated conversations may be stored in a separate database and/or links between messages of a conversation may be stored in message database 245.

Figure 5:
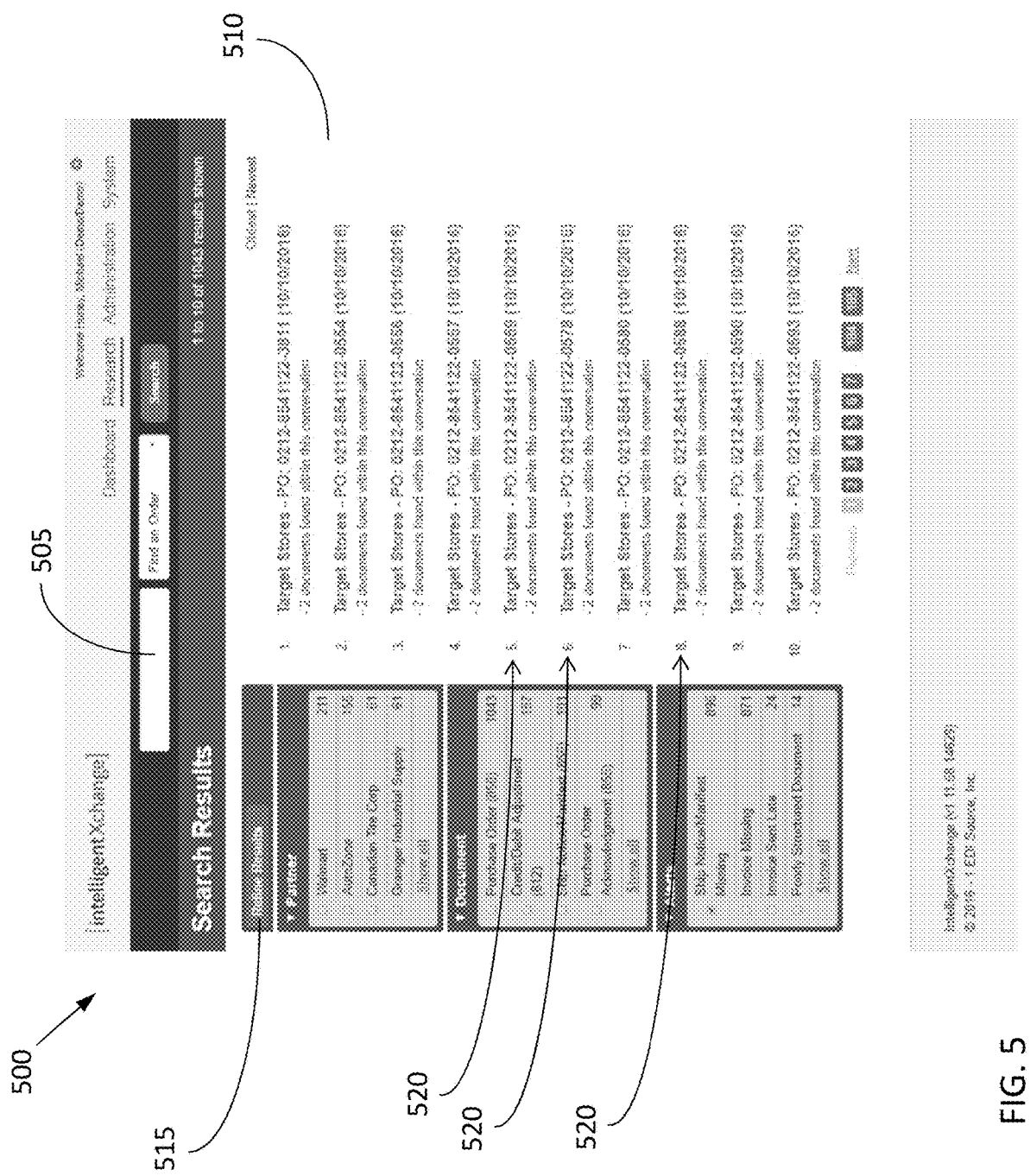
FIG. 5 shows an exemplary screen shot of a user interface that illustrates a result set of conversations.

In one embodiment, the conversation generator 220 may receive a search query from a user and utilize the search query to identify or determine that one or more records, messages, and/or conversations may be responsive to the search query. For example, referring to FIG. 5, an exemplary screen shot of a user interface 500 illustrates a result set of conversations 510 that are responsive to a user search query. In some embodiments, a user may provide a text search query utilizing search box 505. Conversation generator 220 may identify one or more conversations 520 in message database 225 that are responsive to the search query. The search result 510 can return all conversations 520 that meet the criteria, displaying them as conversations, instead of discrete documents. In another embodiment, a user may submit a search query of "Target Stores" and conversation generator 220 may determine that one or more messages in message database 225 are associated with "Target Stores" and/or determine that conversations are associated with related messages. Further, conversation generator 220 may provide a list of responsive conversations 510 to the user-submitted search query. In some embodiments, a user may be provided with a set of filters 515 that may be utilized to prune the search results and/or to suppress display of one or more results. For example, filters 515 may include options to display only conversations from a particular vendor or vendors, a date range of conversations, and/or whether conversations are associated with an alert, as described below.

Figure 6:
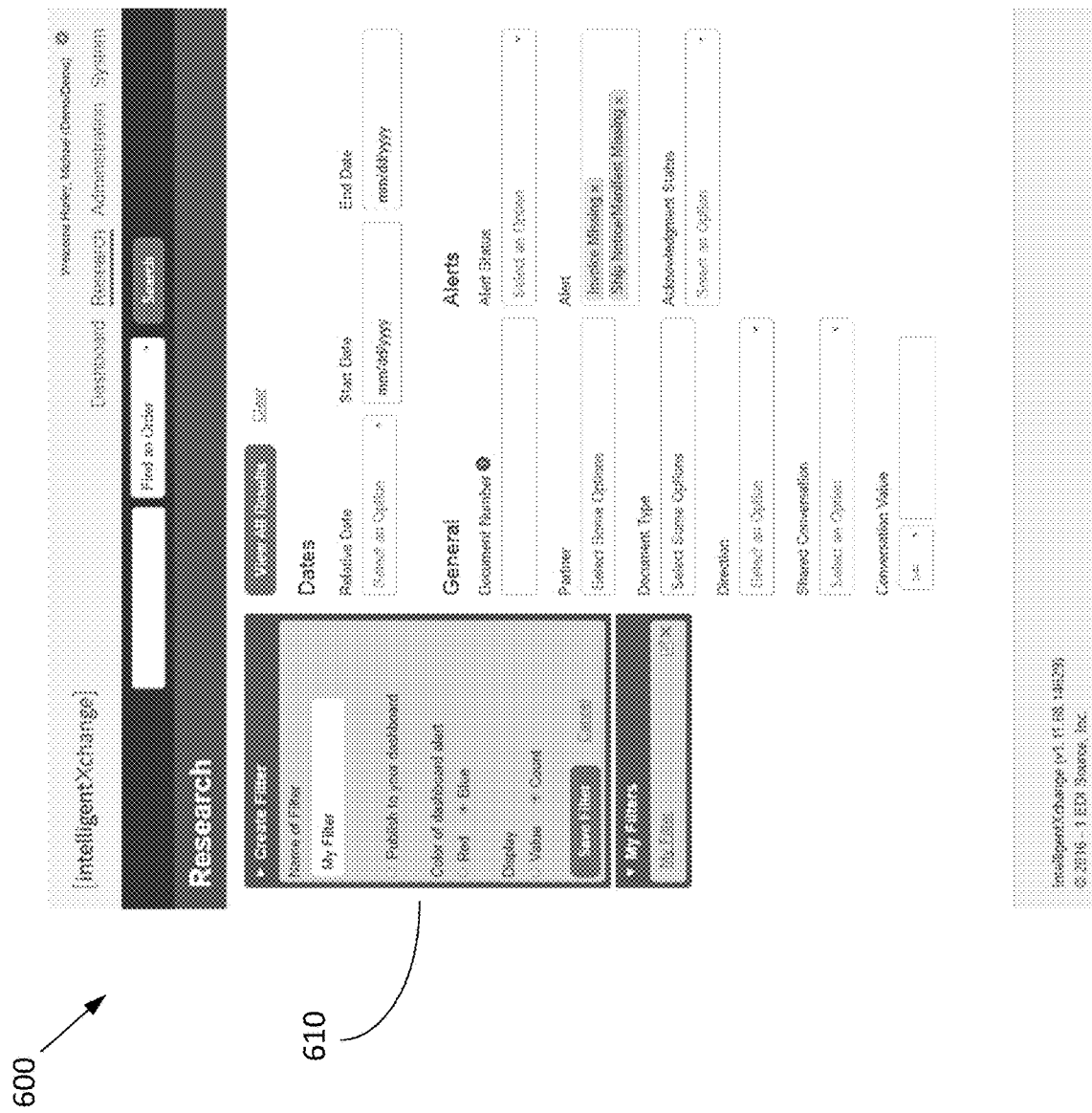
FIG. 6 shows an exemplary screen shot of a user interface that illustrates a research screen.
Figure 7:
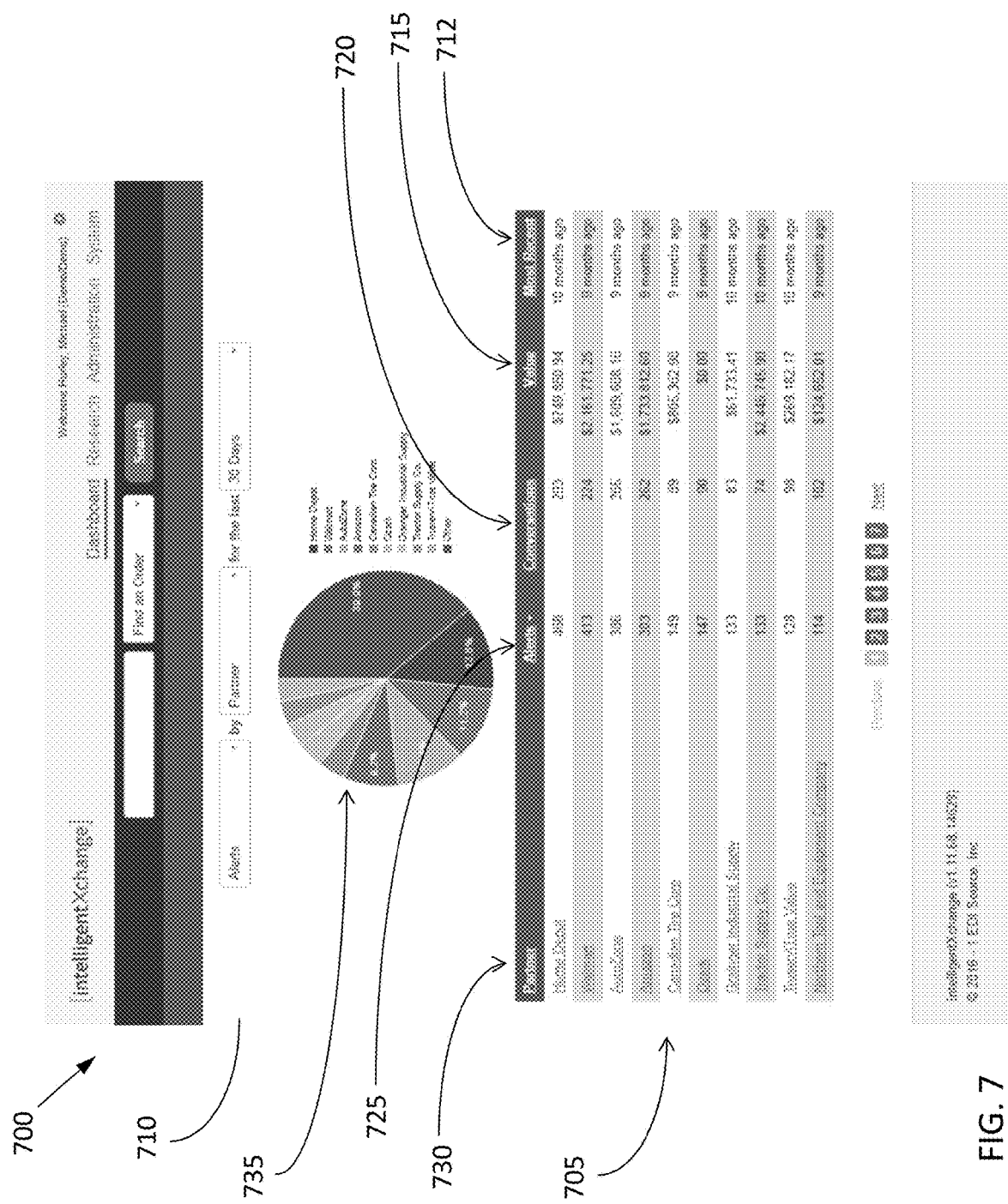
FIG. 7 shows an exemplary screen shot of a user interface screen that displays conversations with alerts.

In some embodiments, a user may create personalized filters. For example, referring to FIG. 6, an exemplary screen shot of a user interface 600 illustrates a research screen 610 that may be utilized by a user to create a personal filter. Users are able to create filters to focus in on conversations of interest. Filters may be saved for later use or published to the dashboard as quick metrics. The user may name the filter and later utilize the filter to identify conversations that are included in a list of conversations with that filter applied. For example, referring now to FIG. 7, an exemplary screen shot of a user interface 700 illustrates a screen 710 that displays all conversations with alerts that have not been cleared. Filters that are published to a dashboard, described below, are displayed to provide quick metrics to the users upon entering the system or application, for example, via a website. The "Partner" column 730 displays the name of the transaction or trading partner, the "Alerts" column 725 displays the number of alerts that are present and uncleared in conversations associated with that trading partner, the "Conversations" column 720 displays the number of conversations that are associated with that trading partner, the "Value" column 715 displays a monetary value of all conversations associated with that trading partner, and the "Most Recent" column 712 displays the most recent occurrence of a message in conversations for that trading partner. Further, the interface screen 710 of FIG. 7 includes a pie chart 735 that can be used to indicate the statistics of one or more of the columns. For example, pie graph 735 displays the proportions of alerts for each of the partners 730.

The value column 715 includes a set of monetary values that are associated with each partner 730. The values in the value column 715 may be determined based on the identified conversations for each of the partners 730. For example, "Home Depot," a purchaser or a vendor, is shown in the partners column 730. The value column 715 includes a corresponding value of "$749,850.94," which may be, for example, an aggregate value of all of the conversations between the organization and "Home Depot," an aggregation of all conversations that include an alert (i.e., the "468" conversations, as provided in the alerts column 725), and/or one or more other aggregations of conversations.

Figure 8:
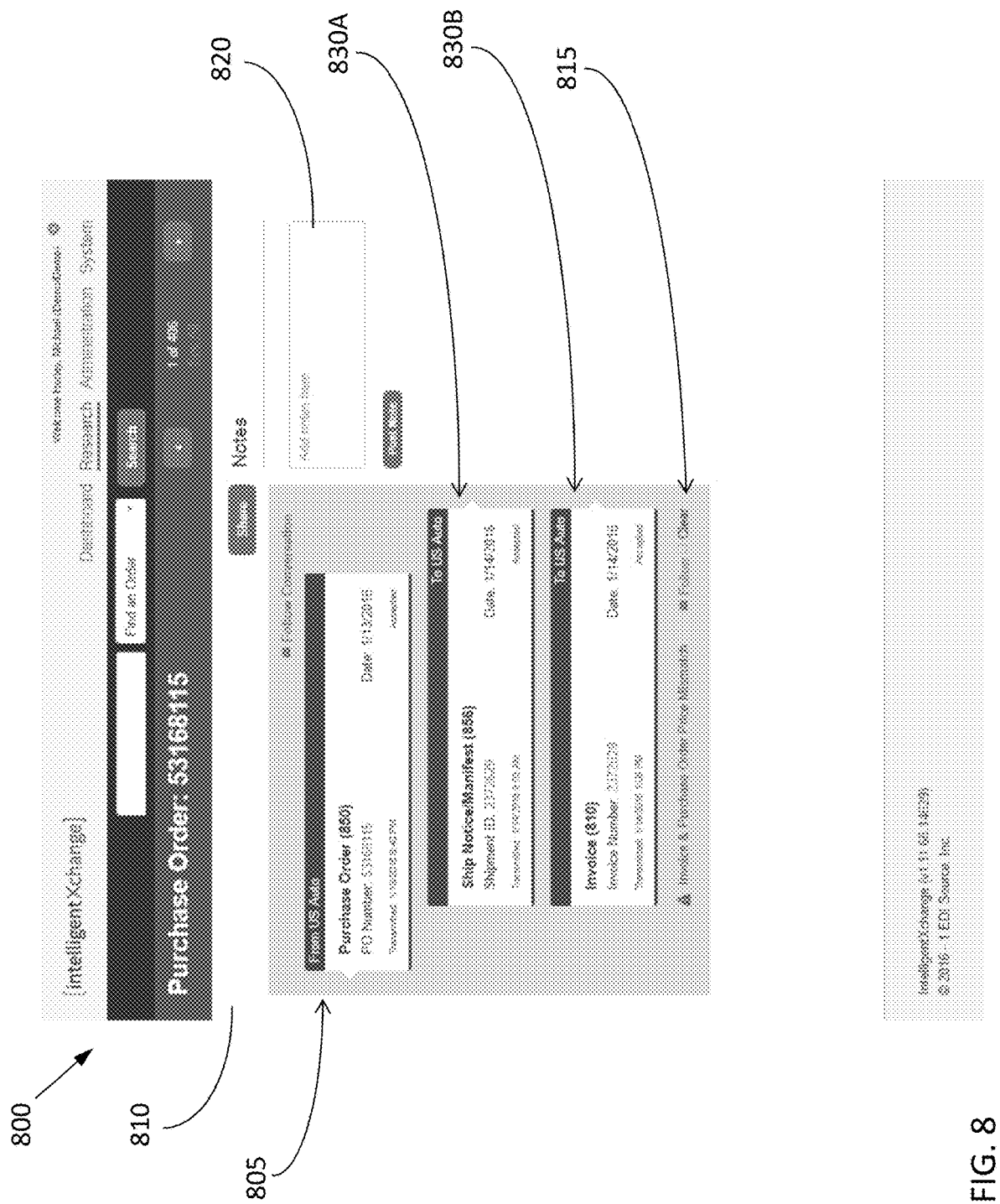
FIG. 8 shows an exemplary screen shot of a user interface that illustrates a conversation view.

Returning now to conversations and with reference to FIG. 8, an exemplary screen shot of a user interface 800 illustrates a conversation view 810. The conversation view 810 can display pertinent data identified in the related electronic documents (records) associated with the transaction in an easy to read rendering of the generated conversation, can display any alerts that have been identified in the documents, and allows users to add notes to the conversation. Users may also choose to "Follow" an individual alert across all conversations or "Follow" a single conversation to be informed when anything changes. In this embodiment, messages of a conversation are provided in a list format, with messages 805 from one user, for example, a trading partner displayed left-justified and messages 830A and 830B from a vendor displayed right-justified, in text boxes. In other embodiments, messages may be displayed in a conversation utilizing one or more alternative formats that portray a conversational style, for example, using speech bubbles. In some embodiments, the messages may include additional and/or alternate information. In the exemplary display 810, the messages include a purchase order number, the sender and/or recipient, a date when the message was sent or received, and a description of the message. In some embodiments, the message text boxes may by selectable or clickable and the user may select a text box to further review information related to the message. For example, a user may select a text box and be provided with a document view, as shown in FIG. 3, or a view of the computer readable EDI message, as shown in FIG. 4. In some embodiments, a user may be provided with an interface for adding additional information related to the conversation. For example, a user viewing the message in FIG. 8 may add additional notes using text box 820.

Figure 9:
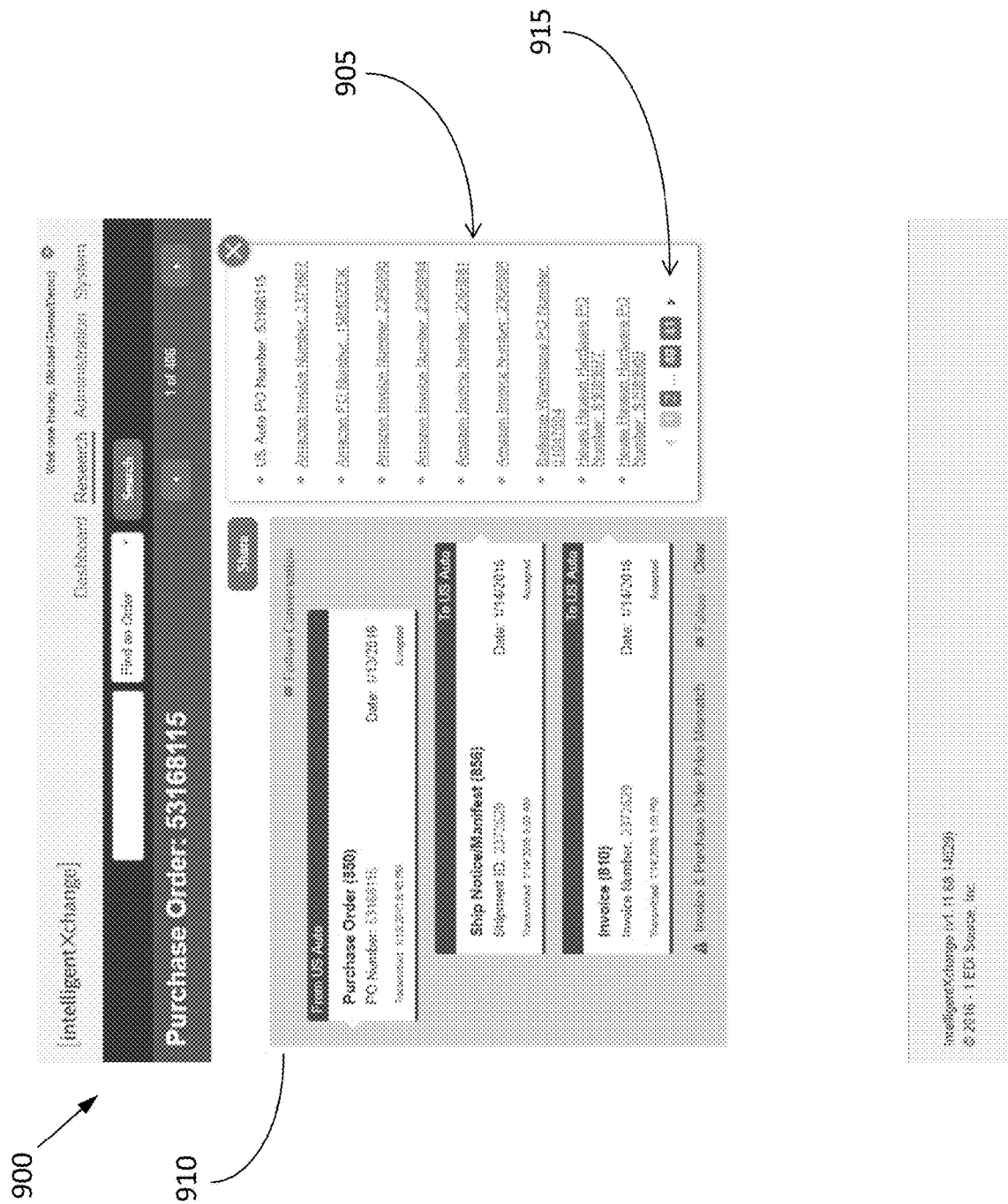
FIG. 9 shows an exemplary screen shot of a user interface screen that provides result set navigation and conversation information to a user.

Referring to FIG. 9, an exemplary screen shot of an additional user interface 900 illustrates a screen 910 that may be utilized to provide result set navigation and conversation information to a user. The screen 910 is similar to the screen 810 illustrated in FIG. 8, but additionally includes a conversation navigation bar 905. Users can navigate to the previous and next conversation using the arrow buttons 915. Using a "See All" feature, users can navigate through the result set. The user may select conversations from navigation bar 905, which may include the same conversations that were determined by conversation generator 220 with respect to FIG. 5.

In some embodiments, a user may send a note, communication, or message to one or more other users, such as, for example, a partner. For example, a user may utilize the system 200 to identify an issue within a conversation, such as a message that has been flagged with an alert, as described below, and may have an interest in sending the message to a vendor. Because the vendor may not be utilizing the same system (i.e., is not another user of the system 200), access to the system 200 would be required in order for the vendor to review the entire conversation in the same format. Therefore, an email may be sent by a user to the vendor that includes a link to one or more static or interactive webpages that allows the recipient of the note to view the information, message, and/or conversation.

Figure 10:
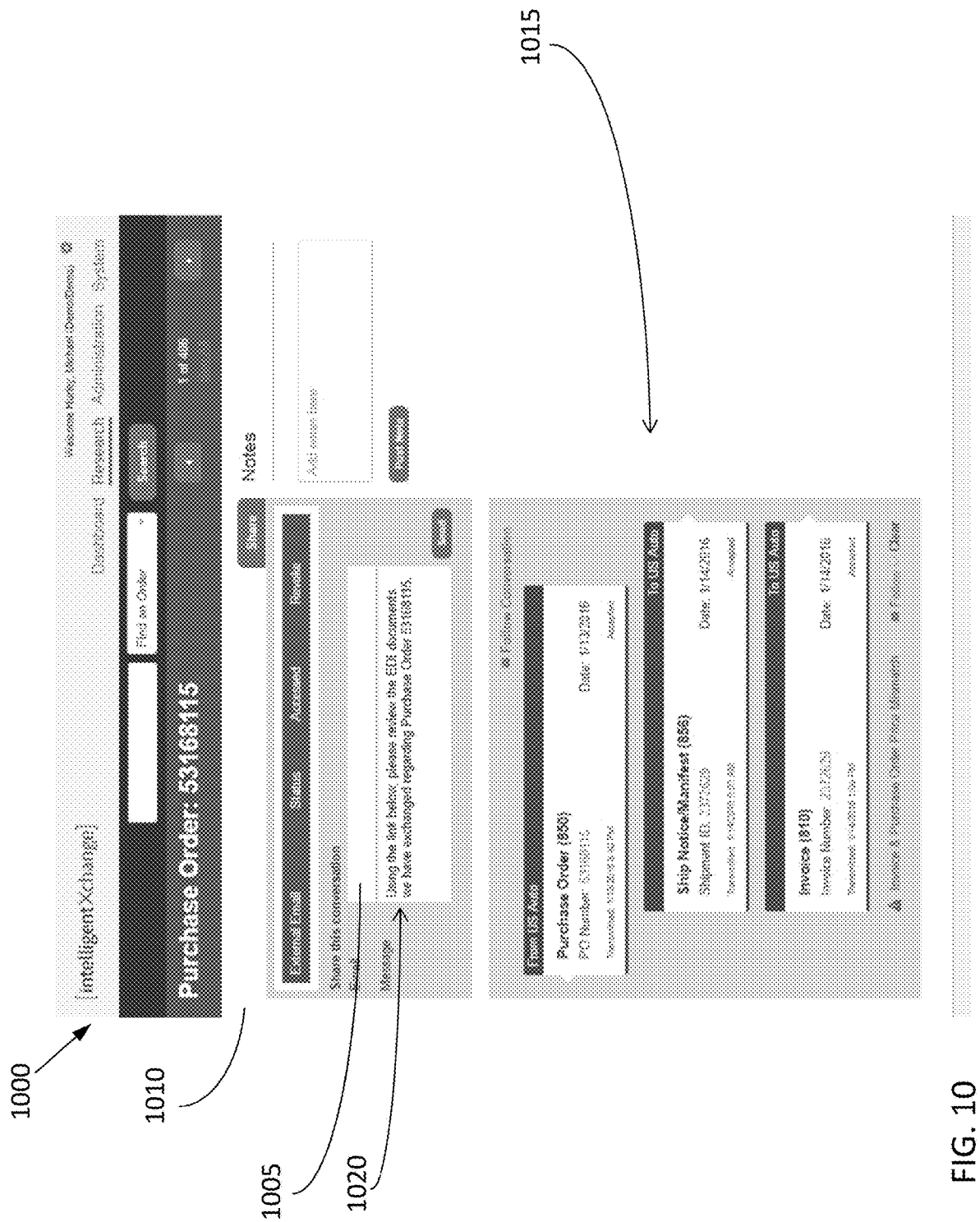
FIG. 10 shows an exemplary screen shot of a user interface screen that allows a user to send a conversation.

For example, referring to FIG. 10, an exemplary screen shot of a user interface 1000 illustrates a screen 1010 that allows a user to send a conversation, for example, to a partner or vendor. Users are able to enter an internal or external email address to share the conversation. The recipient will be able to review all the details for this conversation and optionally add notes. In some embodiments, the receiver may only be able to view the conversation for a limited period of time, for example, for 30 days. Email box 1005 allows the user to enter an email address of a recipient. Note 1020 includes information that may be provided with the email to instruct the vendor on how to access the conversation and an indication of the subject matter of the conversation. Upon receipt of the email, the vendor, for example, utilizing browser 240, may be directed to an interface where the vendor may view conversation 1015. Further, the vendor may be permitted to add additional notations to the communication and/or conversation, that may be stored in the message database 245 for access by one or more users at a later time. For example, a vendor may receive an email indicating that a conversation is available for viewing, access the conversation, and add a notation. The user may then access the conversation and view the notation added by the vendor.

Referring now to the alerts mentioned above, alert engine 225 can determine conversations that may be in error and can flag those conversations. In some embodiments, alert engine 225 may receive a signal from conversation generator 220 that one or more conversations cannot be completely or properly generated because the next expected message in the conversation cannot be located. For example, referring again to FIG. 8, errors 815 indicate that information from one or more of the messages of the conversation is not consistent and/or is missing. Conversation generator 220 may determine the inconsistency and provide an indication to the alert engine 225 to flag and/or further investigate the inconsistency. In some embodiments, a user may be provided with an interface including an option to "follow" the error; that is, to be provided with updates to all instances when that error occurs, irrespective of the conversation or trading partner associated with the error. Also, for example, a user may be provided with an option to track or "follow" a conversation that includes an error in which the user will be alerted of any changes to the conversation, to include new documents or records added to the conversation, for example, new errors identified on the conversation, errors that have been cleared, notes that have been added, etc.

Figure 11:
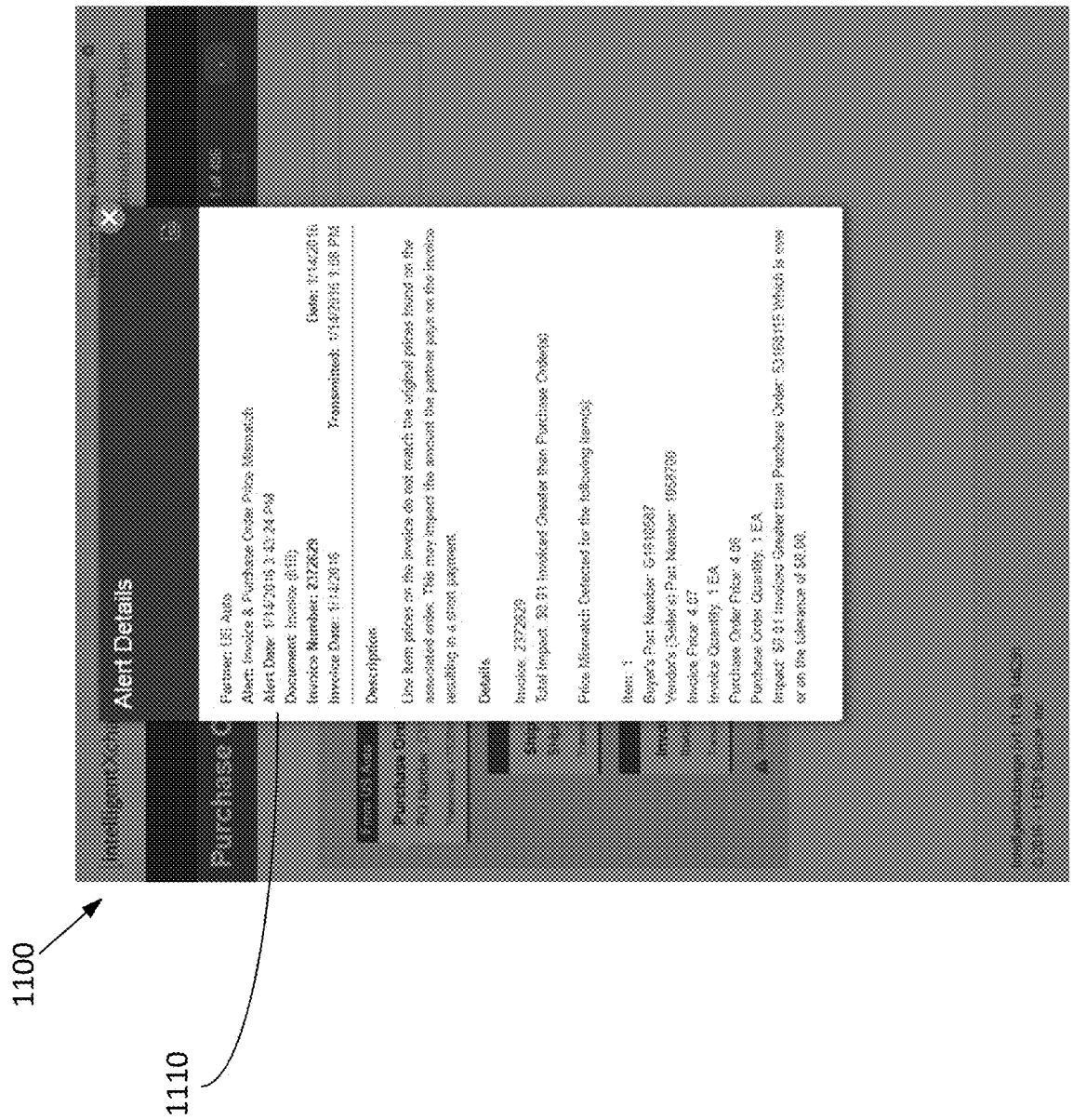
FIG. 11 shows an exemplary screen shot of a user interface screen that includes alert details.

In some embodiments, alert engine 225 may determine an alert based on the identified error. An alert may include information related to how the error was identified, information related to the conversation that included the error, dates related to the error, and/or other information that may be relevant to the error. In some embodiments, the alert may be provided to the user via an interface screen that may include one or more features shown in FIG. 11. For example, the alert details screen 1110 shown in FIG. 11 is related to an error that was identified by conversation generator 220 that prices did not match between messages. Alert engine 225 can generate the alert and provide the alert to the user, for example, when the user selects the alert from the corresponding error indication 815 illustrated in FIG. 8. This feature allows users to view the specific details of alerts that have been flagged against specific transactions.

Figure 12:
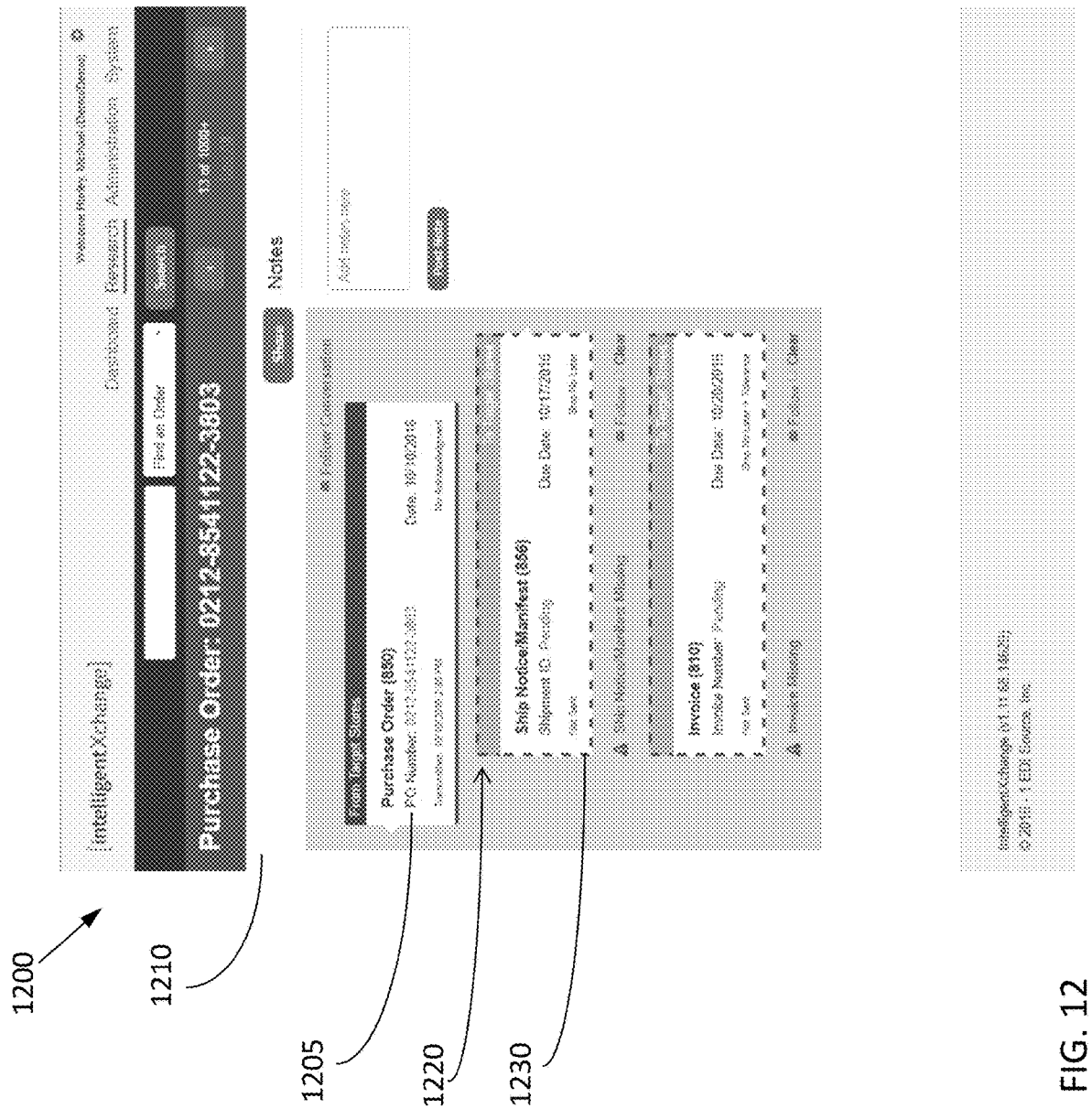
FIG. 12 shows an exemplary screen shot of a user interface screen that illustrates a conversation with missing messages.

In some embodiments, a message or record may be missing from a conversation, and alert engine 225 may determine what message or record is missing and provide an alert message to conversation generator 220. For example, referring to FIG. 12, an exemplary screen shot of a user interface 1200 illustrates a screen 1210 that illustrates a conversation with missing messages. Based on logic in the application, documents (e.g., messages or records) that are expected to be displayed to the user and if there are alerts on these documents, they are associated with these pending documents. For example, message 1205 indicates that a purchase order was received. However, conversation generator 220, in parsing the file associated with message 1205, did not identify additional associated messages to integrate with message 1205. Conversation generator 220 may provide alert engine 225 with an indication of the details of the conversation, and alert engine 225 may then determine that there is no evidence or data associated with an expected message or record, for example here, a shipping notice was not sent. Alert engine 225 may then create a placeholder message 1220 and provide the placeholder message 1220 to conversation generator 220. Conversation generator 220 may receive the message 1220, identify that the message 1220 is a placeholder related to an alert, and provide the placeholder message 1220 to the user, for example, with a dashed border 1230, and an indication that the message 1220 was not received. In some embodiments, the user may be alerted to the conversation. For example, any filters that are set to identify new alerts may be triggered by the alerts associated with the conditions shown in FIG. 12.

Figure 13:
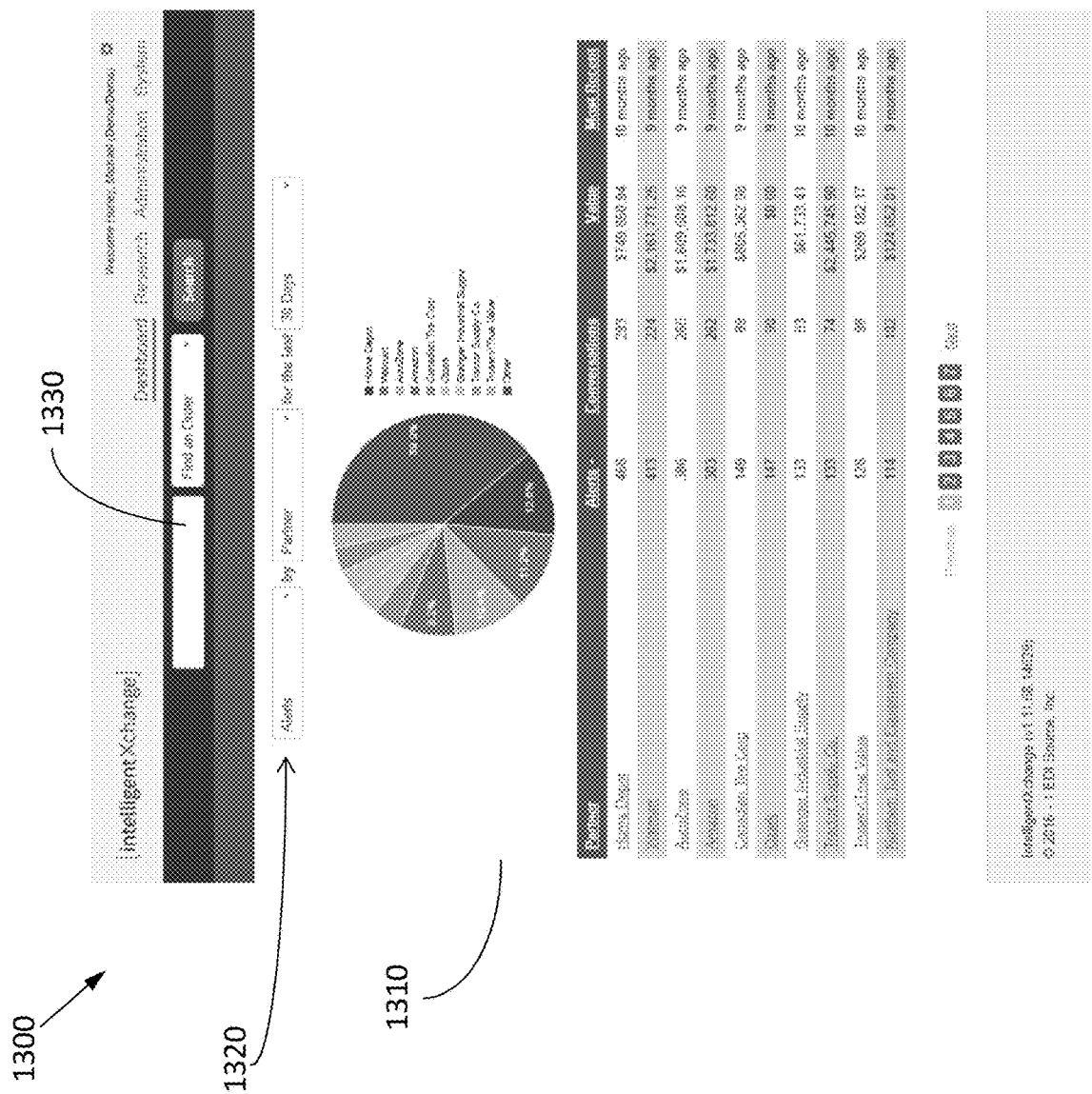
FIG. 13 shows an exemplary screen shot of a user interface that illustrates a dashboard screen.

The system 200 can also provide various other features, as shown in the following screen shots of the application's user interface. For example, referring to FIG. 13, an exemplary screen shot of a user interface 1300 illustrates a dashboard screen 1310. This screen 1310 is similar to screen 710 of FIG. 7 and can allow users to quickly assess how many trading partners they have conversations in error. By selecting "Partner" in the selection fields 1320, the screen 1310 displays the trading partner, the number of alerts, the number of conversations with alerts, and the dollar value associated with the conversations. Users can navigate through the dashboard to conversations that require attention or search for a particular conversation using the search bar 1330 at the top of the screen 1310.

Figure 14:
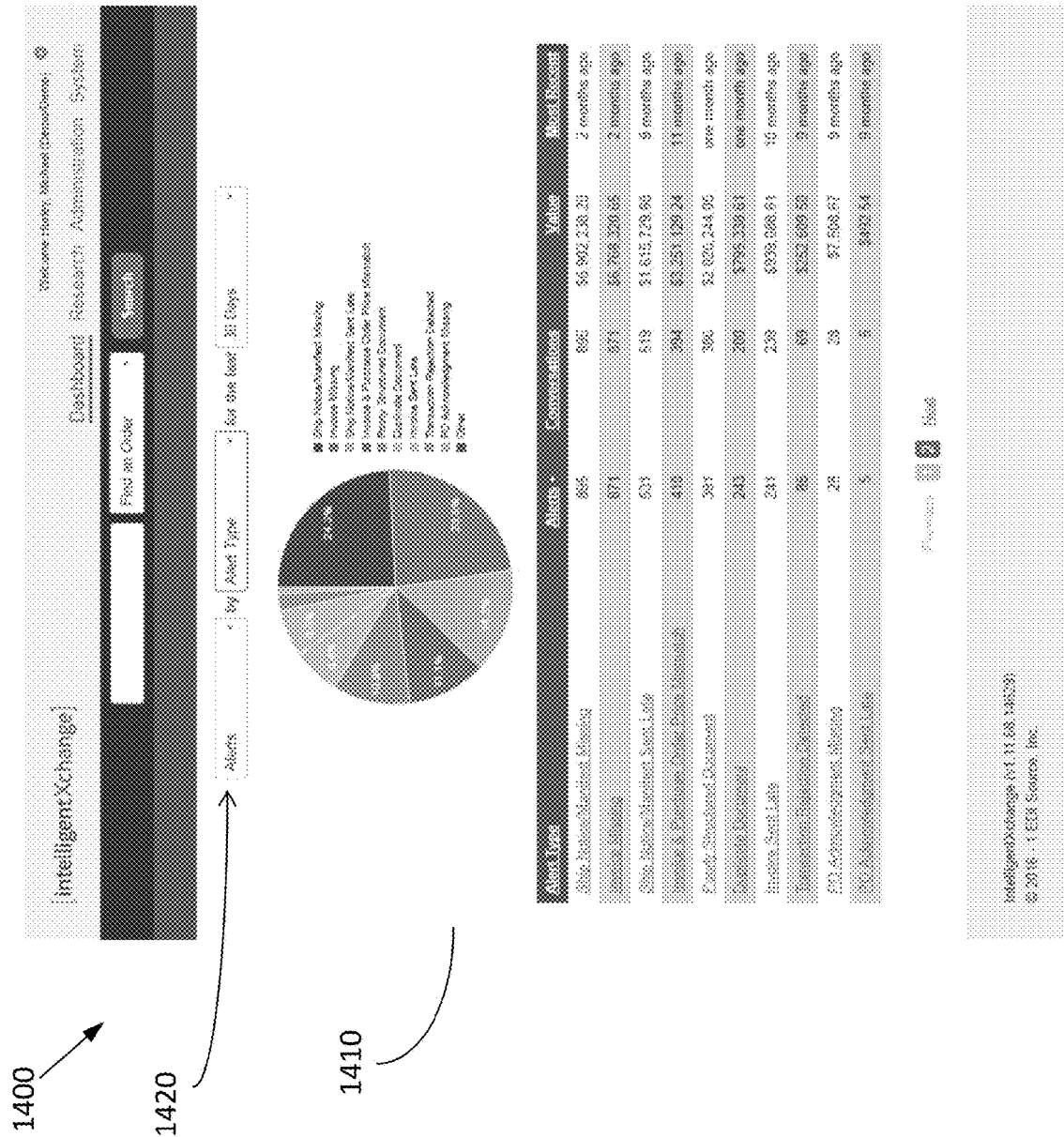
FIG. 14 shows an exemplary screen shot of a user interface that illustrates another dashboard screen.

Referring to FIG. 14, an exemplary screen shot of a user interface 1400 illustrates another dashboard screen 1410. By selecting "Alert Type" in the selection fields 1420, the screen 1410 displays presents information focusing on alerts, instead of the trading partners shown in screen 1310.

Figure 15:
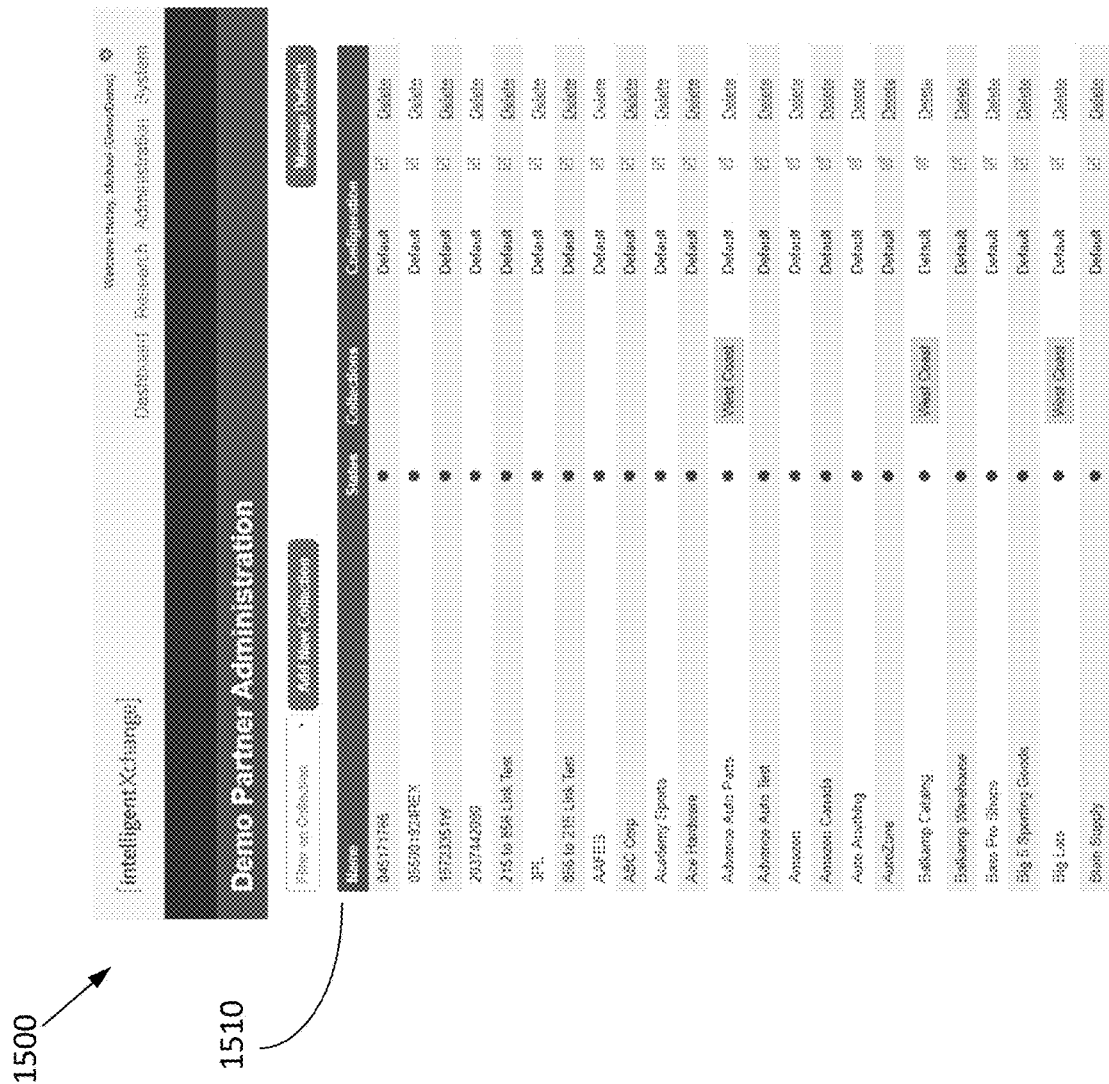
FIG. 15 shows an exemplary screen shot of a user interface that illustrates an administration screen.

Referring to FIG. 15, an exemplary screen shot of a user interface 1500 illustrates an administration screen 1510. In addition to individual user administration and role based security, admin users are able to manage individual settings at a global level and at a trading partner specific level.

Figure 16:
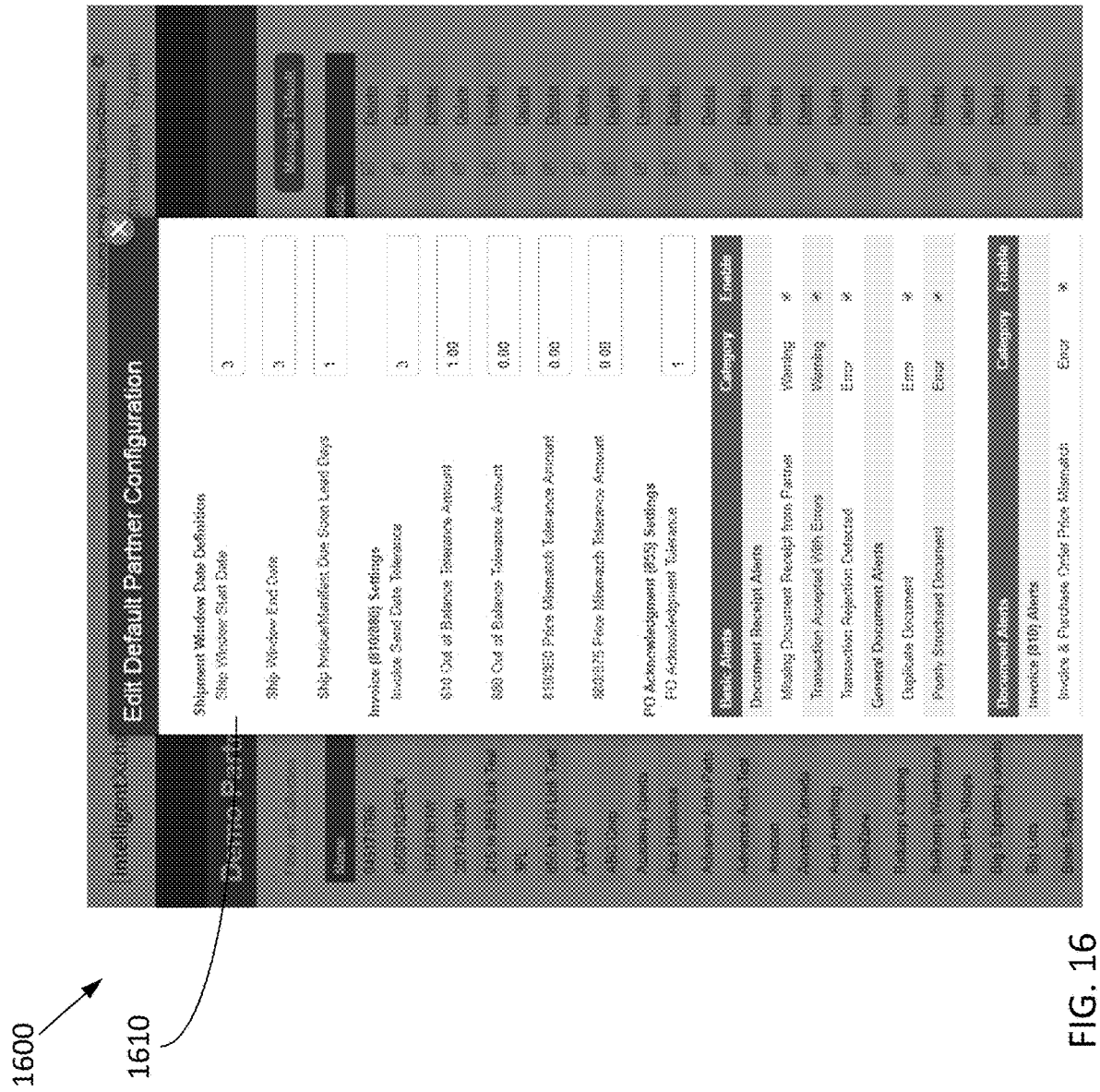
FIG. 16 shows an exemplary screen shot of a user interface that illustrates a configuration screen.

Referring to FIG. 16, an exemplary screen shot of a user interface 1600 illustrates a configuration screen 1610. Admin users are able to set specific settings at the partner level to indicate which types of alerts to display.

Figure 17:
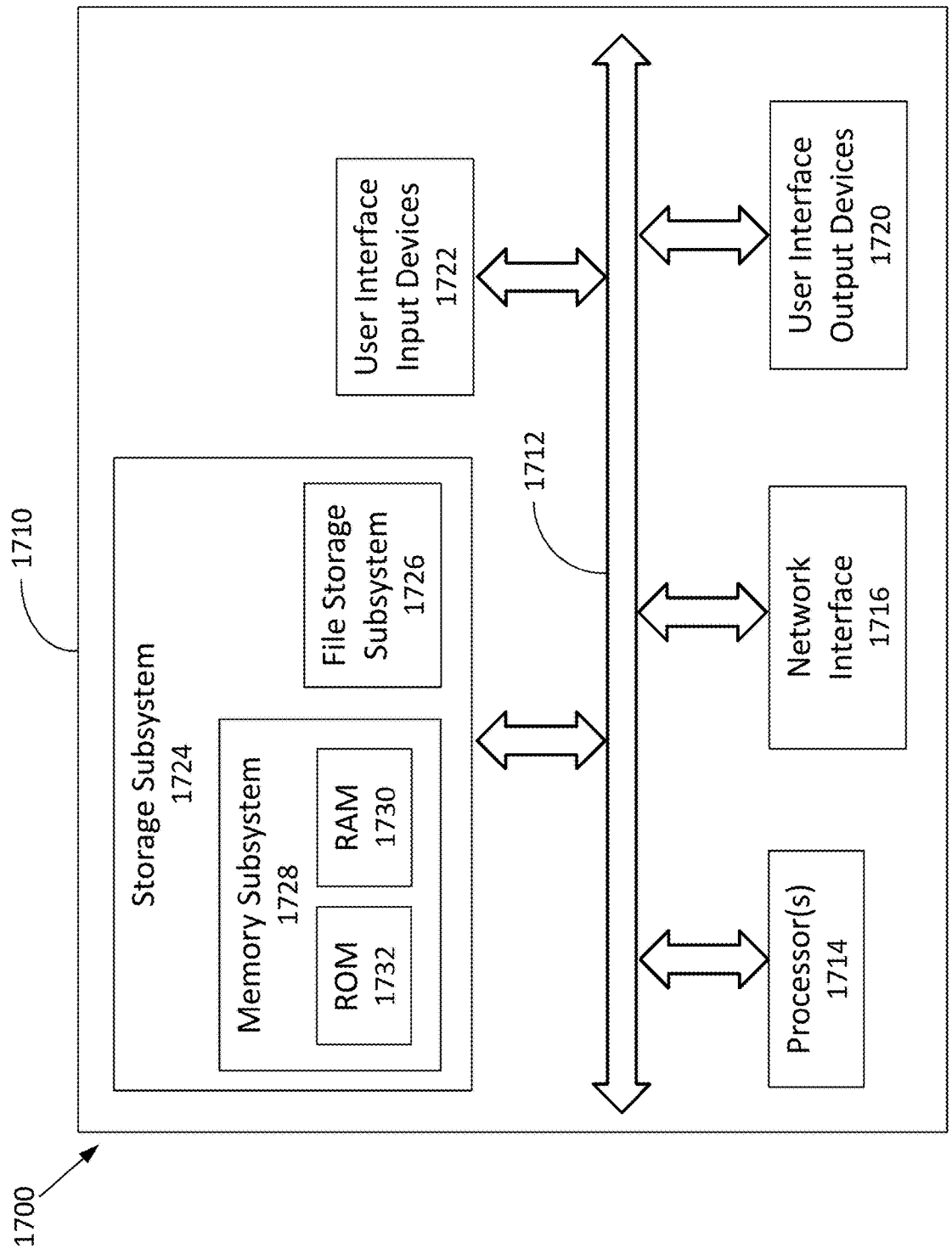
FIG. 17 shows a block diagram of an exemplary device for operating with the system and executing the software.

FIG. 17 is a block diagram of an exemplary system 1710, which may be a computer-based system. Computer system 1710 can include at least one processor 1714 which communicates with a number of peripheral devices via bus subsystem 1712. The bus system 1712 can provide means for operative communication between the various components of the system 1710. The peripheral devices may include a storage subsystem 1724, including, for example, a memory subsystem 1728 and a file storage subsystem 1726, user interface input devices 1722, user interface output devices 1720, and a network interface subsystem 1716. The input and output devices 1722, 1720 allow user interaction with computer system 1710. Network interface subsystem 1716 provides an interface for operative communication with outside networks and is coupled to corresponding interface devices in other computer systems.

User interface input devices 1722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1710 or onto a communication network.

User interface output devices 1720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1710 to the user or to another machine or computer system.

Storage subsystem 1724 stores programming and data constructs that provide the functionality of some or all of the modules and features described herein. For example, the storage subsystem 1724 may include the logic to generate conversations from a plurality of messages and further determine one or more messages that may be absent from the generated conversations.

Software modules are generally executed by processor 1714 alone or in combination with other processors. Memory 1728 used in the storage subsystem can include a number of memories including a main random access memory (RAM) 1730 for storage of instructions and data during program execution and a read only memory (ROM) 1732 in which fixed instructions are stored. A file storage subsystem 1726 can provide persistent storage for program and data files, and may include a flash drive, a hard disk drive, a floppy disk drive along with associated removable media, a CD-ROM drive, an optical drive, or removable media cartridges. The modules implementing the functionality of certain embodiments may be stored by file storage subsystem 1726 in the storage subsystem 1724, or in other devices accessible by the processor(s) 1714.

Bus subsystem 1712 provides a mechanism for letting the various components and subsystems of computer system 1710 communicate with each other as intended. Although bus subsystem 1712 is shown schematically as a single bus, alternative embodiments of the bus subsystem may use multiple busses.

Computer system 1710 can be of varying types including a workstation, server, computing cluster, blade server, server farm, or any other data processing system or computing device. Due to the ever-changing nature of computing devices and networks, the description of computer system 1710 depicted in FIG. 17 is intended only as a specific example for purposes of illustrating some embodiments. Many other configurations of computer system 1710 are possible having more or fewer components than the computer system depicted in FIG. 17.

FIGS. 18 and 19 are block diagrams of exemplary methodologies associated with the systems described above. The exemplary methodologies may be carried out in logic, software, hardware, or combinations thereof. In addition, although the methods are presented in an order, the blocks may be performed in different orders. Further, additional steps or fewer steps may be used.

FIG. 18 shows an exemplary method 1800 of generating a conversation using any of the apparatuses, systems, devices, components, and/or configurations described above. First, at step 1810, the method includes selecting a record or message. Then, at step 1820, the method includes determining additional records associated with the selected record, including as described above. Next, at step 1830, the method includes integrating the data of the records, including as described above. At step 1840, the method includes generating a conversation, including as described above.

FIG. 19 shows an exemplary method 1900 of generating an alert using any of the apparatuses, systems, devices, components, and/or configurations described above. First, at step 1910, the method includes identifying or generating a conversation, including as described above. Then, at step 1920, the method includes determining an error in the conversation, including as described above. Next, at step 1930, the method includes generating an alert, including as described above.

While the present invention has been illustrated by the description of embodiments thereof and while the embodiments have been described in considerable detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus and methods, and illustrative examples shown and described. Accordingly, departures may be made from such details without departing from the spirit or scope of the applicant's general inventive concept. While the embodiments discussed herein have been related to the systems and methods discussed above, these embodiments are intended to be exemplary and are not intended to limit the applicability of these embodiments to only those discussions set forth herein. The systems and methodologies discussed herein may be equally applicable to, and can be utilized in, other systems and methods.

We claim:

1. A system for generating conversational depictions of electronic data exchanges, comprising:
    a first user device to select a first record comprising EDI data;
    a conversation generator configured to:
        determine additional records associated with the first record based on the EDI data, wherein the records are associated with a plurality of messages exchanged between parties of a transaction;
        integrate the EDI data of the first record and the EDI data of the additional records based on associations within the EDI data to form integrated EDI data; and
        generate a conversation that depicts the integrated EDI data in a conversational format comprising the plurality of messages; and
    a user interface to display the conversation.

2. The system of claim 1, wherein the records comprise raw data stored in a plurality of EDI data formats.

3. The system of claim 1, wherein the conversation generator is further configured to parse the first record to identify the EDI data used to determine the additional records.

4. The system of claim 3, wherein EDI data associated with the first record is found in at least one message related to the first record.

5. The system of claim 4, wherein the first record comprises a purchase order and the EDI data comprises at least one of a vendor name, a product name, and a volume of a product.

6. The system of claim 5, wherein the at least one message comprises a purchase order acknowledgement by the vendor.

7. The system of claim 4, wherein the first record comprises a purchase order acknowledgement by a vendor and the at least one message comprises a purchase order.

8. The system of claim 1, further comprising a database, wherein at least one of the conversation and links between records of the conversation are stored in the database.

9. The system of claim 1, wherein the conversation generator is further configured to query for at least one of records, transactions, messages, and conversations associated with a search term.

10. The system of claim 1, further comprising an alert engine, wherein the alert engine is configured to determine an error in the conversation based on the EDI data.

11. The system of claim 10, wherein the alert engine is further configured to generate an alert based on the error.

12. The system of claim 10, wherein the alert engine is configured to determine the error in the conversation based on missing EDI source data.

13. The system of claim 10, wherein the alert engine is configured to determine the error in the conversation based on inconsistent EDI source data.

14. The system of claim 10, wherein the conversation generator is further configured to track the conversation based on the error.

15. The system of claim 10, wherein the alert engine is further configured to generate a placeholder message in the conversation based on the error.

16. A method for generating conversational depictions of electronic data exchanges, comprising the steps of:
    selecting a first record comprising EDI data with a first user device;
    determining additional records associated with the first record based on the EDI data, wherein the records are associated with a plurality of messages exchanged between parties of a transaction;
    integrating the EDI data of the first record and the EDI data of the additional records based on associations within the EDI data to form integrated EDI data;
    generating a conversation that depicts the integrated EDI data in a conversational format comprising the plurality of messages; and
    displaying the conversation on a user interface.

17. The method of claim 16, wherein the records comprise raw data stored in a plurality of EDI data formats.

18. The method of claim 16, further comprising the step of parsing the first record to identify the EDI source data used to determine the additional records.

19. The method of claim 16, further comprising the step of determining an error in the conversation based on the EDI data.

20. The method of claim 19, further comprising the step of generating an alert based on the error.

21. A method for generating a conversational depiction of electronic data exchanges, comprising the steps of:
   selecting a first message comprising EDI data with a first user device;
   determining additional messages associated with the first message based on the EDI data, wherein the messages are exchanged between parties of a transaction;
   integrating the EDI data of the first message and the EDI data of the additional messages based on associations within the EDI data to form integrated EDI data;
   generating a conversation that depicts the integrated EDI data in a conversational format comprising the plurality of messages; and
   displaying the conversation on a user interface.

* * * * *